US008736096B2

(12) United States Patent
Kiyose et al.

(10) Patent No.: US 8,736,096 B2
(45) Date of Patent: May 27, 2014

(54) WATER FLOW ELECTRICITY GENERATING DEVICE

(75) Inventors: Hiromitsu Kiyose, Kobe (JP); Kiyoto Owaki, Kobe (JP); Etsuya Yanase, Kobe (JP); Youhei Murase, Kakogawa (JP); Hiroyasu Okawa, Amagasaki (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/989,891

(22) PCT Filed: Oct. 24, 2011

(86) PCT No.: PCT/JP2011/005939
§ 371 (c)(1),
(2), (4) Date: Jul. 5, 2013

(87) PCT Pub. No.: WO2012/070186
PCT Pub. Date: May 31, 2012

(65) Prior Publication Data
US 2013/0277980 A1 Oct. 24, 2013

(30) Foreign Application Priority Data
Nov. 25, 2010 (JP) ................................. 2010-262385

(51) Int. Cl.
*F03B 13/00* (2006.01)
*H02P 9/04* (2006.01)
*F03B 13/10* (2006.01)
*F03B 13/12* (2006.01)

(52) U.S. Cl.
USPC ................................. 290/54; 290/43; 290/53

(58) Field of Classification Search
USPC ................................................ 290/43, 53, 54
See application file for complete search history.

(56) References Cited

U.S. PATENT DOCUMENTS 2,501,696 A * 3/1950 Souczek ........................ 290/43
4,112,864 A * 9/1978 Bergman ...................... 114/265
(Continued)

FOREIGN PATENT DOCUMENTS

DE 10 2007 061 185 A1 6/2009
JP A 2002-138940 5/2002
(Continued)

OTHER PUBLICATIONS

Dec. 20, 2011 International Search Report issued in International Patent Application No. PCT/JP2011/005939.

(Continued)

*Primary Examiner* — Pedro J Cuevas
(74) *Attorney, Agent, or Firm* — Oliff PLC

(57) ABSTRACT

A water flow electricity generating device includes: an annular stator in which a coil is provided; a permanent magnet that causes a magnetic force to act on the coil; a rotor main body that is disposed on an inner circumferential side of a stator core to support the permanent magnet; a blade support unit that is provided on a front side of the rotor main body; a rotor that includes a rotating blade projecting radially outward from the blade support unit; and water-lubricated bearings that are provided in the stator while being opposed to the rotor main body, the water-lubricated bearings supporting loads in a thrust direction and a radial direction. The blade support unit is disposed on a front side of the rotor main body, and the rotor includes a float unit that is provided on the front side of the rotor main body.

11 Claims, 8 Drawing Sheets

(56) References Cited

U.S. PATENT DOCUMENTS

| | | | |
|---|---|---|---|
| 4,383,182 A * | 5/1983 | Bowley | 290/43 |
| 4,850,190 A * | 7/1989 | Pitts | 60/398 |
| 4,864,152 A * | 9/1989 | Pedersen | 290/53 |
| 6,091,161 A * | 7/2000 | Dehlsen et al. | 290/43 |
| 6,104,097 A * | 8/2000 | Lehoczky | 290/54 |
| 6,168,373 B1 * | 1/2001 | Vauthier | 415/7 |
| 6,531,788 B2 * | 3/2003 | Robson | 290/43 |
| 7,291,936 B1 * | 11/2007 | Robson | 290/43 |
| 7,441,988 B2 * | 10/2008 | Manchester | 405/75 |
| 7,489,046 B2 * | 2/2009 | Costin | 290/43 |
| 7,541,688 B2 * | 6/2009 | Mackie | 290/54 |
| 7,682,126 B2 * | 3/2010 | Parker | 415/3.1 |
| 7,737,570 B2 * | 6/2010 | Costin | 290/43 |
| 7,851,936 B2 * | 12/2010 | Bolin | 290/54 |
| 7,936,077 B2 * | 5/2011 | Lehoczky | 290/43 |
| 7,939,957 B2 * | 5/2011 | Costin | 290/54 |
| 8,288,882 B2 * | 10/2012 | Bolin | 290/54 |
| 8,308,422 B2 * | 11/2012 | Williams | 415/7 |
| 8,441,139 B2 * | 5/2013 | Karimi | 290/53 |
| 8,558,403 B2 * | 10/2013 | Rooney | 290/54 |
| 2002/0158472 A1 * | 10/2002 | Robson | 290/43 |
| 2007/0241566 A1 * | 10/2007 | Kuehnle | 290/53 |
| 2007/0257492 A1 * | 11/2007 | Robson | 290/54 |
| 2008/0012345 A1 * | 1/2008 | Parker | 290/54 |
| 2008/0258465 A1 * | 10/2008 | Johnston | 290/53 |
| 2009/0278357 A1 * | 11/2009 | Williams | 290/53 |
| 2010/0025998 A1 | 2/2010 | Williams | 290/52 |
| 2010/0232962 A1 * | 9/2010 | Bolin | 416/85 |
| 2010/0295309 A1 | 11/2010 | Holstein et al. | 290/52 |
| 2012/0257955 A1 * | 10/2012 | Rooney | 415/7 |
| 2013/0106105 A1 * | 5/2013 | Dehlsen et al. | 290/43 |

FOREIGN PATENT DOCUMENTS

| | | |
|---|---|---|
| JP | A 2003-262180 | 9/2003 |
| JP | A 2004-316484 | 11/2004 |
| JP | A 2006-070763 | 3/2006 |
| JP | A 2009-8098 | 1/2009 |
| JP | A 2009-543970 | 12/2009 |
| WO | WO 2008/114482 A1 | 9/2008 |

OTHER PUBLICATIONS

Dec. 20, 2011 Written Opinion issued in International Patent Application No. PCT/JP2011/005939 (with translation).

* cited by examiner (a)

(b)

WATER FLOW ELECTRICITY GENERATING DEVICE

TECHNICAL FIELD

The present invention relates to a water flow electricity generating device that generates electricity using water flow energy of a tidal current, an ocean current, a river current, or the like.

BACKGROUND ART

From the viewpoint of an energy issue or an environment issue in recent years, various investigations are made in order to utilize clean natural energy that can replace fossil energy sources such as petroleum. For example, hydro-electric power generation, in which drop energy of dammed water is used, is implemented as electricity generation of the natural energy. However, in order to perform the hydro-electric power generation, it is necessary to construct a dam that retains a water-level difference, a large amount of construction cost is required, and an environmental load also increases. On the other hand, nowadays, attention is paid to existence of a place where a large water flow (the tidal current, the ocean current, and the river current) is generated in the sea and river, and a floating plant that generates electricity using water flow energy has been proposed (for example, see Japanese Unexamined Patent Publication No. 2009-8098).

SUMMARY OF THE INVENTION

Problems to be Solved by the Invention

In the water flow electricity generating device, a rotating blade is fixed to a leading end portion of a shaft coupled to a rotor of an electricity generator, and the rotating blade is used while submerged in the water at the place where the large water flow is generated. The shaft of which the rotating blade is fixed to the leading end portion is supported by the electricity generator like a cantilever, and a biased load acts on a bearing that supports the rotor, which degrades durability. Generally, from the viewpoint of sliding performance or a wear-resistant property, an oil-lubrication device is required for the bearing in order to supply lubrication oil. Therefore, introduction and maintenance of the oil-lubrication device are costly. However, as described above, the large support load acts on the bearing, and the oil-lubrication device is currently required in the water flow electricity generating device.

Japanese Unexamined Patent Publication No. 2009-8098 also proposes a floating plant in which the electricity generator is supported at one end of a support arm while a support structure is pivoted on the other end. However, the durability or maintenance is not improved.

An object of the present invention is to provide a water flow electricity generating device in which the durability and the maintenance are improved without the oil lubrication.

Solutions to the Problems

A water flow electricity generating device according to the present invention includes: a stator that supports an annular stator core in which a coil is provided; a rotor that includes a magnet, a rotor main body, a blade support unit, and a rotating blade, the magnet causing a magnetic force to act on the coil, the rotor main body being disposed on an inner circumferential side of the stator core to support the magnet, the blade support unit being provided on one side in a rotating axis line direction of the rotor main body, the rotating blade projecting radially outward from the blade support unit; and a water-lubricated bearing that is disposed while being opposed to the rotor main body, the water-lubricated bearing supporting loads in a thrust direction and a radial direction, wherein the blade support unit is disposed on one side in the rotating axis line direction of the rotor main body, and the rotor includes a float unit that is disposed on one side in the rotating axis line direction of the rotor main body.

According to the above configuration, because the rotor includes the float unit that is disposed on one side in the rotating axis line direction of the rotor main body, a buoyant force acts on a portion on one side in the rotating axis line direction of the rotor main body in the rotor. As a result, even in the configuration, such as the cantilever, in which the blade support unit is disposed on one side in the rotating axis line direction of the rotor main body, action of gravity such that a free end side of the cantilever hangs down is relaxed. Accordingly, the durability degradation due to the action of the biased load on the bearing supporting the rotor can be suppressed. The bearing in which not oil but water is used as a lubrication medium can easily be used by suppressing the action of the biased load on the bearing. Therefore, the oil-lubrication device can be eliminated, the device cost can be reduced, and the maintenance can be improved.

EMBODIMENTS OF THE INVENTION

Hereinafter, an embodiment of the present invention will be described with reference to the drawings.

(Configuration of Water Flow Electricity Generating Device 1)

Figure 1:
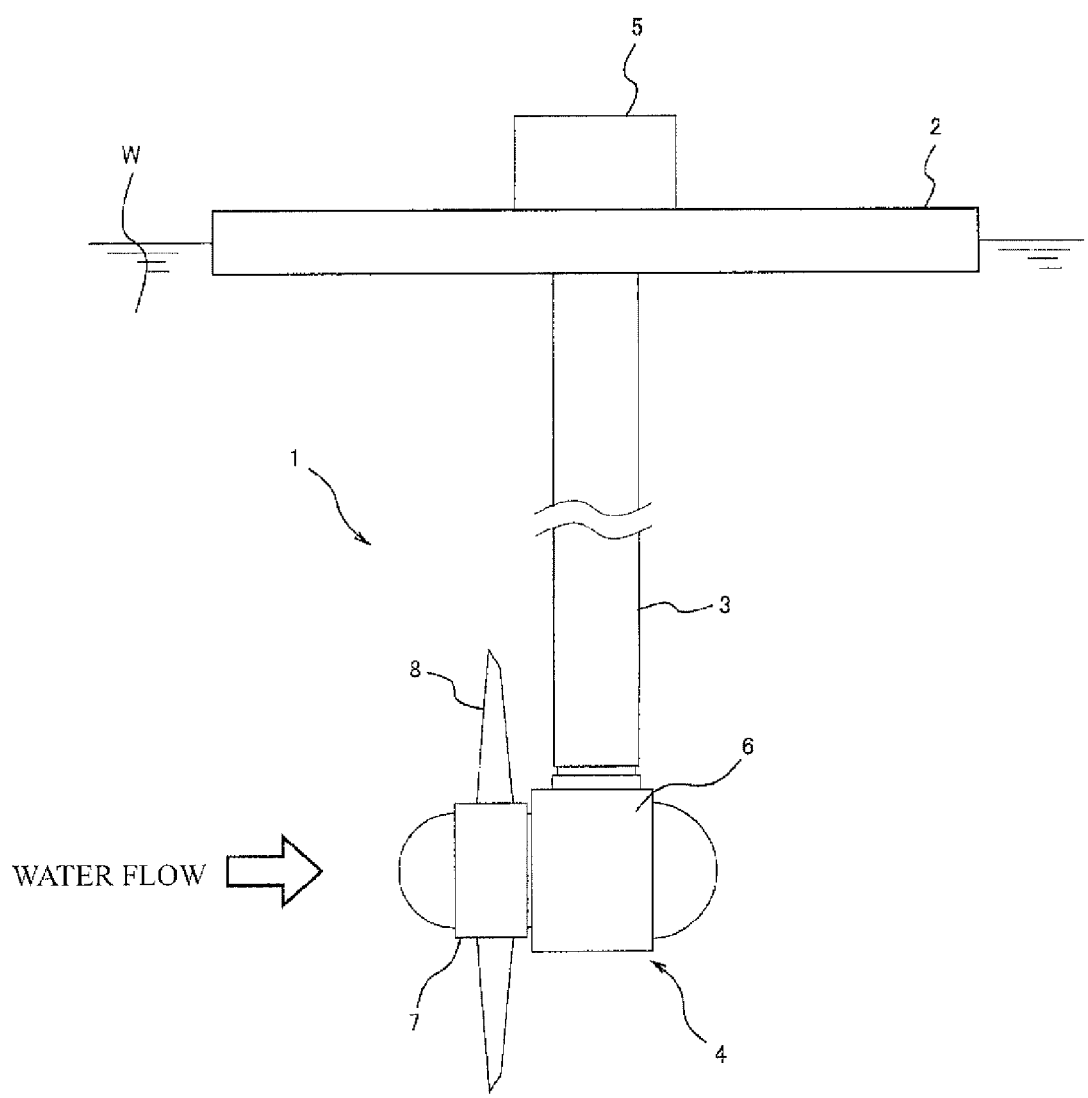
FIG. 1 is an outline view of a water flow electricity generating device according to an embodiment of the present invention.

FIG. 1 is an outline view of a water flow electricity generating device 1 according to an embodiment of the present invention. As illustrated in FIG. 1, the water flow electricity generating device 1 includes a floating body 2 that floats on water, a support post 3 that droops into water W from the floating body 2, an electricity generating unit 4 that is provided at a lower end of the support post 3, and a control chamber 5 that is provided on an upper surface of the floating body 2. The electricity generating unit 4 includes a substantially annular stator 6 that is connected to the support post 3 and a rotor 7 that is inserted in an inner circumferential side of the stator 6. In the rotor 7, a rotating blade 8 is attached to a portion that projects forward from the stator 6. That is, in the water flow electricity generating device 1, water flows, such as tidal currents, ocean currents, and river currents, strike on the rotating blade 8 to rotate the rotor 7, thereby generating the electricity.

Figure 2:
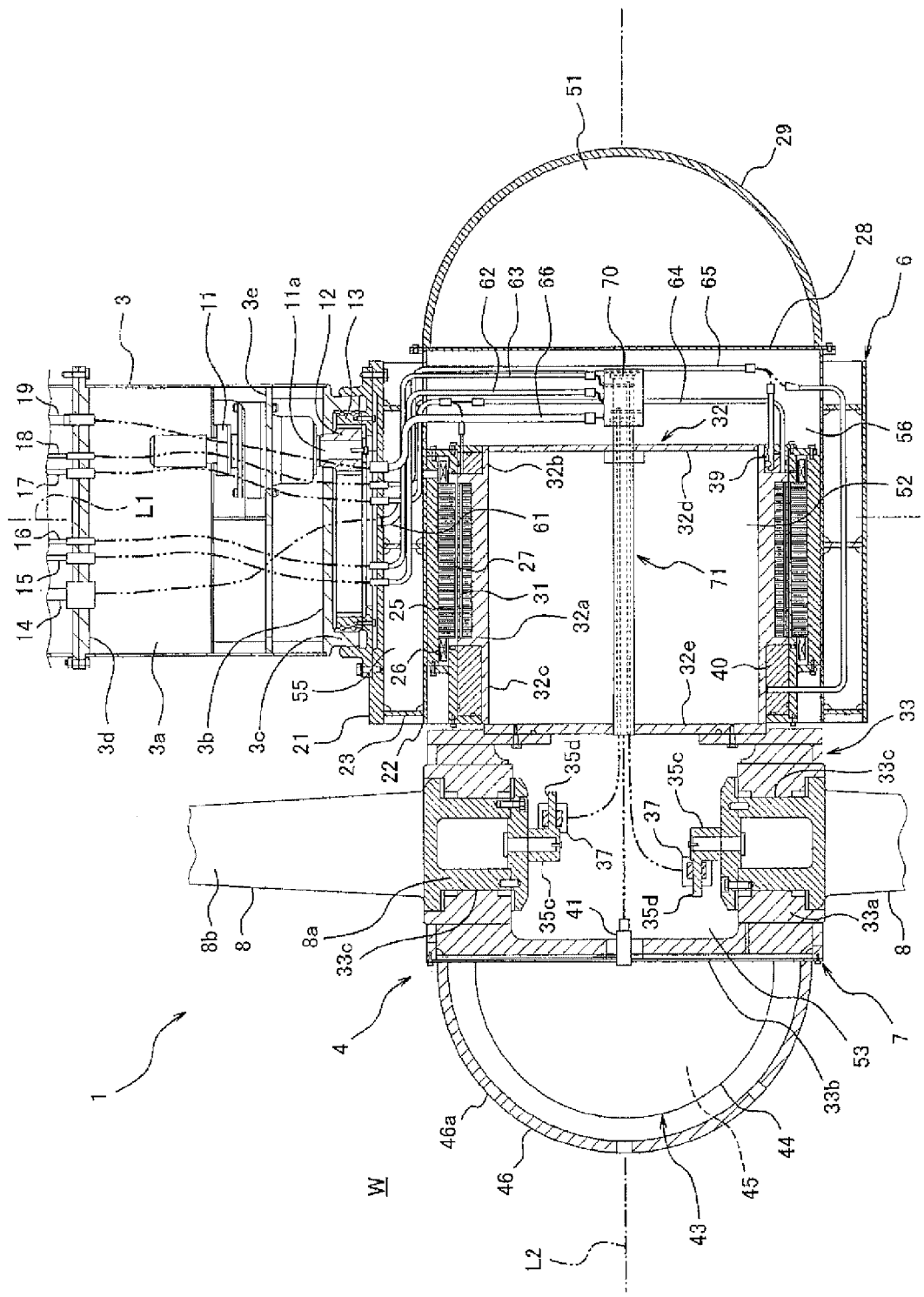
FIG. 2 is a sectional view illustrating the water flow electricity generating device in FIG. 1 when the water flow electricity generating device is laterally viewed.
Figure 3:
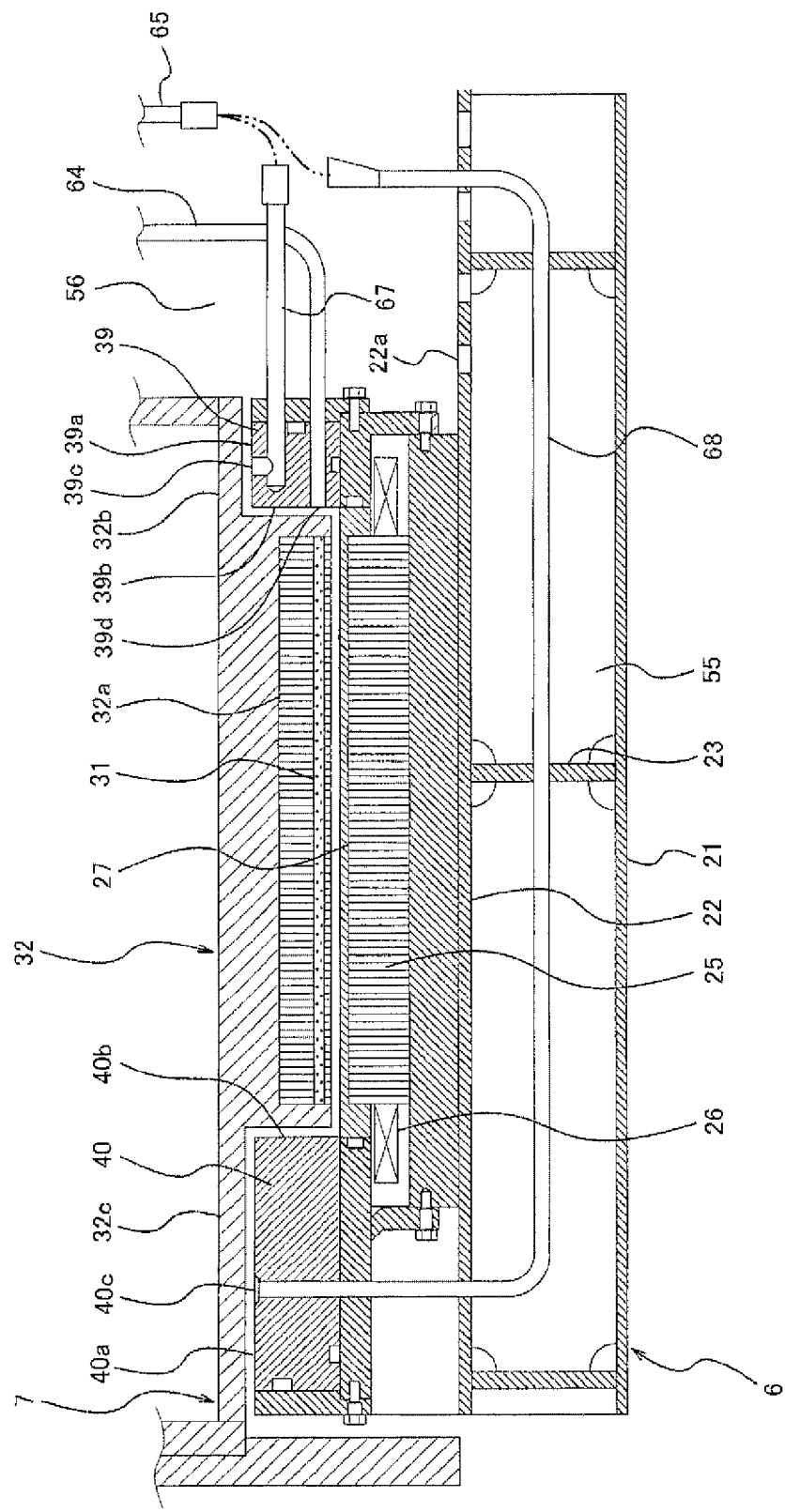
FIG. 3 is a partially enlarged view of the water flow electricity generating device in FIG. 2.
Figure 4:
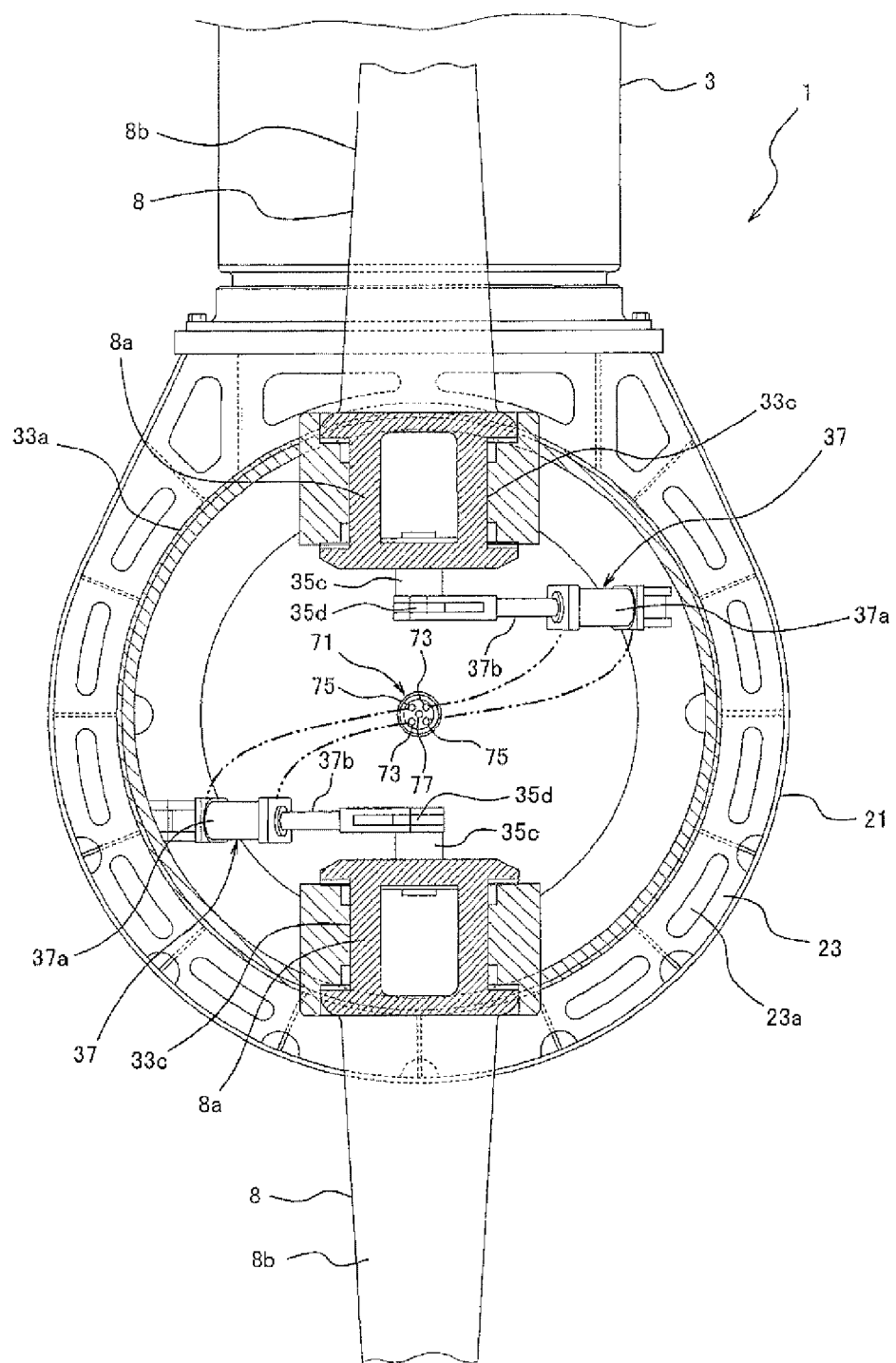
FIG. 4 is a sectional view illustrating the water flow electricity generating device in FIG. 2 when the water flow electricity generating device is viewed from a front side.

FIG. 2 is a sectional view illustrating the water flow electricity generating device 1 in FIG. 1 when the water flow electricity generating device 1 is laterally viewed. FIG. 3 is a partially enlarged view of the water flow electricity generating device 1 in FIG. 2. FIG. 4 is a sectional view illustrating the water flow electricity generating device 1 in FIG. 2 when the water flow electricity generating device 1 is viewed from a front side. As illustrated in FIG. 2, a space 3a is formed in the support post 3, and the inner space 3a acts as a pathway that communicates the control chamber 5 and the electricity generating unit 4. An electric cable 14, hydraulic pipes 15 and 16, water flow pipes 17 and 18, and an air pipe 19 are accommodated in the inner space 3a of the support post 3, upper ends of the hydraulic pipes 15 and 16, the water flow pipes 17 and 18, and the air pipe 19 are conducted to the control chamber 5 (see FIG. 1), and lower ends of those pipes are fixed to the support post 3 with a fixed plate 3d interposed therebetween. A swirling motor 11 that is fixed to the support post 3 with another fixed plate 3e interposed therebetween is disposed in the inner space 3a below the fixed plate 3d, and an output shaft 11a of the swirling motor 11 extends downward so as to pierce a bottom wall 3b of the support post 3. The control chamber 5 feeds power to the swirling motor 11 using a power feeding cable (not illustrated) passing through the inner space 3a.

A cylindrical wall 3c that projects downward is provided in an outer circumferential portion of the bottom wall 3b of the support post 3. A ring rack gear 13 fixed to the stator 6 is disposed in an inner portion surrounded by the cylindrical wall 3c. An outer circumferential surface of the rack gear 13 is a slide surface sliding on an inner circumferential surface of the cylindrical wall 3c, and an inner circumferential surface of the rack gear 13 is a tooth plane. A pinion gear 12 is provided in a lower end portion of the output shaft 11a of the swirling motor 11, and an external tooth of the pinion gear 12 engages an internal tooth of the rack gear 13. When the swirling motor 11 is driven to rotate the output shaft 11a, rotating power of the output shaft 11a is transmitted to the stator 6 through the pinion gear 12 and rack gear 13, and the stator 6 and the rotor 7 are swirled about a vertical axis line L1 passing through a center of the support post 3.

The stator 6 includes an outer cylinder 21, an inner cylinder 22, and a spacer 23 that partially connects the outer cylinder 21 and the inner cylinder 22. A circular space 55 is formed between the outer cylinder 21 and the inner cylinder 22. An electric cable 61, hydraulic pipes 62 and 63, water flow pipes 64 and 65, and an air pipe 66 are partially disposed in the circular space 55, and upper ends of the electric cable 61, the hydraulic pipes 62 and 63, the water flow pipes 64 and 65, and the air pipe 66 are fixed to the outer cylinder 21. The upper ends of the electric cable 61, the hydraulic pipes 62 and 63, the water flow pipes 64 and 65, and the air pipe 66 are connected to the lower ends of the electric cable 14, the hydraulic pipes 15 and 16, the water flow pipes 17 and 18, and the air pipe 19, which are located in the support post 3, using a flexible electric cable, hydraulic pipes, water flow pipes, and an air pipe (alternate long and two short dashes lines in FIG. 2), respectively. Holes 23a (see FIG. 3) are partially made in the spacer 23 at intervals in a circumferential direction, and the circular space 55 is communicated with the water W. Because the water flowing from the front side toward the spacer 23 flows partially in the circular space 55 through the holes 23a of the spacer 23, a water flow load applied on the spacer 23 is suppressed, and a flow rate decreases when the water flow goes out from the hole 23a to the circular space 55. Therefore, loads applied on the electric cable 14, the hydraulic pipes 15 and 16, the water flow pipes 17 and 18, and the air pipe 19 are also suppressed.

A stator core 25 (laminated iron core), a coil 26 that is wound around the stator core 25, and a waterproof film 27 that covers an inner circumferential surface of the stator core 25 are provided on an inner circumferential side of the inner cylinder 22 of the stator 6. The stator core 25 and the coil 26 are disposed while biased toward front sides (a left side in FIG. 2) of the outer cylinder 21 and inner cylinder 22, and lateral centers of the stator core 25 and coil 26 are deviated forward (the left side in FIG. 2) from the vertical axis line L1. A rotor main body 32 that is of a rear-side portion of the rotor 7 is disposed on the inner circumferential side of the stator 6 so as to be opposed to the stator core 25 with respect to the waterproof film 27. That is, the rotor main body 32 is also disposed while biased toward the front sides (the left side in FIG. 2) of the outer cylinder 21 and inner cylinder 22, and the lateral center of the rotor main body 32 is deviated forward (the left side in FIG. 2) from the vertical axis line L1. Therefore, a backside space 56 is formed on the inner circumferential side of the inner cylinder 22 and a rear side (a right side in FIG. 2) of the rotor main body 32.

A hollow hemispherical body 29 including an air space 51 is connected to a rear end of the inner cylinder 22, and the hollow hemispherical body 29 closes the backside space 56 from the rear side. Holes 22a are made in the inner cylinder 22 at intervals so as to communicate the circular space 55 with the backside space 56, whereby the backside space 56 is also communicated with the water W. The electric cable 61, the hydraulic pipes 62 and 63, the water flow pipes 64 and 65, and the air pipe 66 pierce the inner cylinder 22, and are conducted from the circular space 55 to the backside space 56.

The rotor main body 32 includes a circular unit 32a in which a permanent magnet 31 that causes a magnetic force to act on the coil 26 is buried in an outer circumference, guard units 32b and 32c that project backward and forward from an inner circumferential end of the circular unit 32a, and disc units 32d and 32e that are connected to a rear end of the guard unit 32b and a front end of the guard unit 32c to form an air space 52 in the rotor main body 32. A first water-lubricated bearing 39 and a second water-lubricated bearing 40 are attached to the stator 6 while being opposed to the circular unit 32a and guard unit 32b of the rotor 7. The first water-lubricated bearing 39 and the second water-lubricated bearing 40 support the load from the rotor 7 in a thrust direction and a radial direction. The second water-lubricated bearing 40 is disposed on the front side (the left side in FIG. 2) of the first water-lubricated bearing 39 while being closer to a blade support unit 33. The first water-lubricated bearing 39 and the second water-lubricated bearing 40 are made of an annular ceramic material having a quadrangular shape in section.

As illustrated in FIG. 3, a gap between the water-lubricated bearing 40 and the rotor main body 32 are communicated with the water W on an upstream side, and a gap between the water-lubricated bearing 39 and the rotor main body 32 is communicated with the backside space 56 on a downstream side. The water flowing from the water W into the gap between the first water-lubricated bearing 39 and the guard unit 32c passes through the gap between the waterproof film 27 and the circular unit 32a, and flows out to the backside space 56 from the gap between the second water-lubricated bearing 40 and the guard unit 32b. The outflow water is ejected to the outside through the backside space 56 behind the rotor 7 and the circular space 55

An area of a radial surface 40a that supports the load in the radial direction in the second water-lubricated bearing 40 is larger than an area of a radial surface 39a that supports the load in the radial direction in the first water-lubricated bearing 39. For example, the area of the radial surface 40a is twice to four times larger than the area of the radial surface 39a. However, inner diameters of the first water-lubricated bearing 39 and second water-lubricated bearing 40 are substantially equal to each other, outer diameters of the first water-lubricated bearing 39 and second water-lubricated bearing 40 are substantially equal to each other, and an area of a thrust surface 40b that supports the load in the thrust direction in the second water-lubricated bearing 40 is substantially equal to an area of a thrust surface 40b that supports the load in the thrust direction in the first water-lubricated bearing 39.

Water discharge holes 39c and 40c opened in the radial surfaces 39a and 40a are made radially inward in lower portions of the first water-lubricated bearing 39 and second water-lubricated bearing 40 so as to be opposed to the guard units 32b and 32c of the rotor main body 32. The water discharge holes 39c and 40c of the first water-lubricated bearing 39 and the second water-lubricated bearing 40 are communicated with water flow pipes 67 and 68 connected to a water flow pipe 65. The water flow pipe 68 communicated with the water discharge hole 40e of the second water-lubricated bearing 40 is disposed while passing through the circular space 55. Furthermore, the water is discharged from the water discharge holes 39c and 40c at the beginning of the rotation of the rotor 7, whereby the rotor 7 is supported by the water discharged upward from below. The water discharge holes 39c and 40c opened in the radial surfaces 39a and 40a may be provided only in the lower portions of the first water-lubricated bearing 39 and second water-lubricated bearing 40, or the water discharge holes 39c and 40c may be distributed such that the numbers of water discharge holes 39c and 40c in the lower portion are larger than those in the upper portion.

A water discharge hole 39d opened in a thrust surface 39b is made toward an opposite direction to the water flow direction in the first water-lubricated bearing 39 so as to be opposed to the circular unit 32a of the rotor main body 32 (a water discharge hole opened in a thrust surface 40b is not made in the second water-lubricated bearing 40). The water discharge holes 39d are evenly distributed in the whole circumference of the first water-lubricated bearing 39. The water flow pipe 64 is communicated with the water discharge holes 39d. In other words, the water is discharged from the water discharge holes 39d, whereby the load in the thrust direction, which is generated in the rotor 7 such that the water flow impinges on the rotating blade 8, is supported by the water discharged in the opposite direction to the load.

As illustrated in FIG. 2, the rotor 7 includes the blade support unit 33 that is provided on the front side (the left side in FIG. 2) in a direction of a rotating axis line L2 of the rotor main body 32 and the rotating blade 8 that projects radially outward from the blade support unit 33. The rotating blade 8 is disposed in a central portion (assuming that a front end is 0% while a rear end is 100%, a range of 35% to 60%) in the direction of the rotating axis line L2 of the rotor 7. The blade support unit 33 includes an annular unit 33a in which plural (in the embodiment, two) blade support holes 33c are circumferentially made at equal intervals and a disc unit 33b that is connected to the front end of the annular unit 33a to form an air space 53 between the annular unit 33a and the disc unit 32e.

The rotating blade 8 includes a base unit 8a, a blade unit 8b that projects radially outward from the base unit 8a, and a shaft unit 35c that projects radially inward from the base unit 8a. The base unit 8a of the rotating blade 8 is mounted in the blade support hole 33c so as not to move radially, and so as to rotate radially to be able to change a pitch angle. As used herein, the pitch angle means an angle of a blade chord of the blade unit 8b with respect to the rotating axis line L2. Accordingly, the blade unit 8b takes out more energy from the water flow when the pitch angle is small, and the blade unit 8b takes out the less energy from the water flow when the pitch angle is large.

As illustrated in FIGS. 2 and 4, a hydraulic cylinder 37 is disposed in the air space 53 of the blade support unit 33. The hydraulic cylinder 37 includes a cylinder main body 37a that is fixed to the blade support unit 33 and a rod unit 37b that advances from or retracts to the cylinder main body 37a. Further, a lever unit 35d that projects toward a direction orthogonal to the radial direction is provided in the shaft unit 35c of the rotating blade 8, and the rod unit 37b of the hydraulic cylinder 37 is connected to the lever unit 35d.

A multi-flow-channel pipe 71 passing through the air space 52 is fixedly provided in the rotor main body 32. The multi-flow-channel pipe 71 is connected to the hydraulic pipes 62 and 63 and air pipe 66 with a swivel joint 70 interposed therebetween (the swivel joint 70 is well known as a rotatable fluid coupling). A first water flow channel 73, a second water flow channel 75, and an air flow channel 77 are formed in the multi-flow-channel pipe 71. The first water flow channel 73 is communicated with a head side of the hydraulic cylinder 37 through the hydraulic pipe (the alternate long and two short dashes line in FIG. 4), and the second water flow channel 75 is communicated with a cap side of the hydraulic cylinder 37 through the hydraulic pipe (the alternate long and two short dashes line in FIG. 4). Further, the hydraulic cylinder 37 is driven by a hydraulic pressure from the first water flow channel 73 or the second water flow channel 75, and the rod unit 37b advances or retracts, thereby changing the pitch angle of the rotating blade 8.

As illustrated in FIG. 2, the rotor 7 includes a float unit 43 that is provided on the front side (the left side in FIG. 2) in the direction of the rotating axis line L2 of the blade support unit 33. The float unit 43 includes an air chamber 45 and a bag unit 44, which defines the air chamber 45 and is attached to the front surface of the disc unit 33b of the blade support unit 33. An air nozzle 41 communicated with the air chamber 45 of the float unit 43 is fixed to the disc unit 33b of the blade support unit 33, and the air nozzle 41 is communicated with the air flow channel 77 (see FIG. 4) of the multi-flow-channel pipe 71 through the air pipe (the alternate long and two short dashes line in FIG. 2). That is, the float unit 43 is an air bag that can be inflated and contracted by the supply and exhaust of the air through the air nozzle 41.

The float unit 43 becomes a hemispherical shape that is narrowed forward in the most inflated state. A hemispherical front-end dome unit 46 is fixed to the front end of the blade support unit 33 so as to be narrowed forward, and the front-end dome unit 46 is disposed so as to form a gap with the float unit 43 in the most inflated state. A hole 46a is partially made in the front-end dome unit 46, and the gap between the front-end dome unit 46 and the float unit 43 is communicated with the water W through the hole 46a. Therefore, the bag unit 44 of the float unit 43 acts as a movable partition member that partitions the water W and the air chamber 45 to be able to change a volume of the air chamber 45.

In the water flow electricity generating device 1, when the water flowing from the front side impinges on the blade unit 8b to rotate the rotor 7, the permanent magnet 31 fixed to the rotor 7 rotates relative to the stator core 25 to generate an electromotive force in the coil 26, and the power generated in the coil 26 is supplied to the control chamber 5 (see FIG. 1) through the electric cables 14 and 61. A speed increaser is not provided in the water flow electricity generating device 1 of the embodiment.

Figure 5:
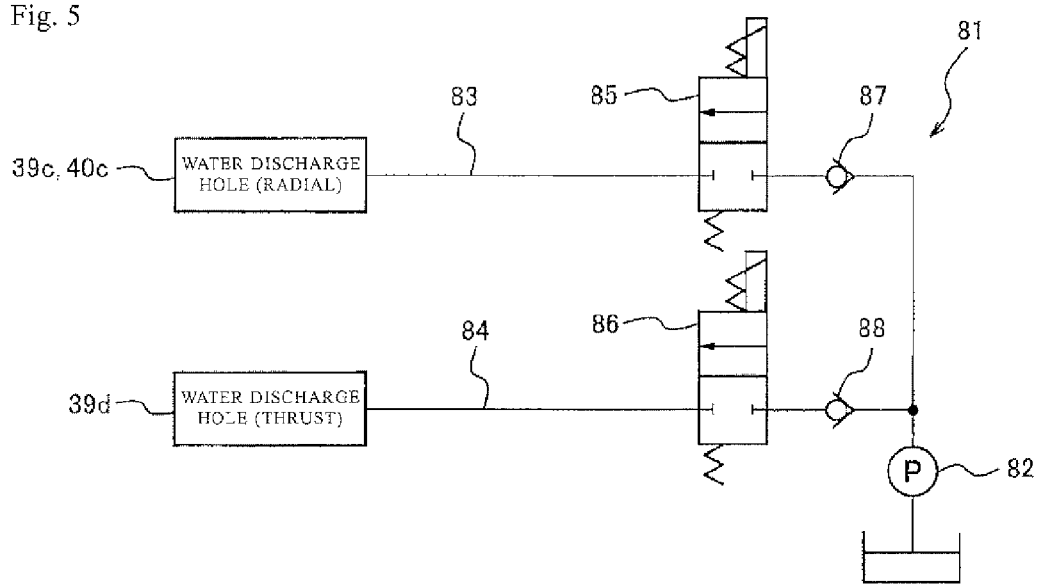
FIG. 5 is a schematic view illustrating a water supply device of the water flow electricity generating device in FIG. 2.

FIG. 5 is a schematic view illustrating a water supply device 81 of the water flow electricity generating device 1 in FIG. 2. As illustrated in FIGS. 3 and 5, the water is supplied to the water discharge holes 39c and 40c in the radial surfaces 39a and 40a of the first water-lubricated bearing 39 and second water-lubricated bearing 40 through a headrace 83, and the water is supplied to the water discharge hole 39d in the thrust surface 39b of the second water-lubricated bearing 40 through a headrace 84. The headraces 83 and 84 are constructed by the above-described water flow pipes 15, 16, 64, and 65. The water supply device 81 includes a water pump 82 that supplies the water to the headraces 83 and 84, electromagnetic on-off valves 85 and 86 that open and close the headraces 83 and 84, and check valves 87 and 88 that prevent a reverse flow of the water into the water pump 82. The water pump 82, the electromagnetic on-off valves 85 and 86, and the check valves 87 and 88 are disposed in the control chamber 5. A relief valve for protecting a circuit is not illustrated in FIG. 5.

Figure 6:
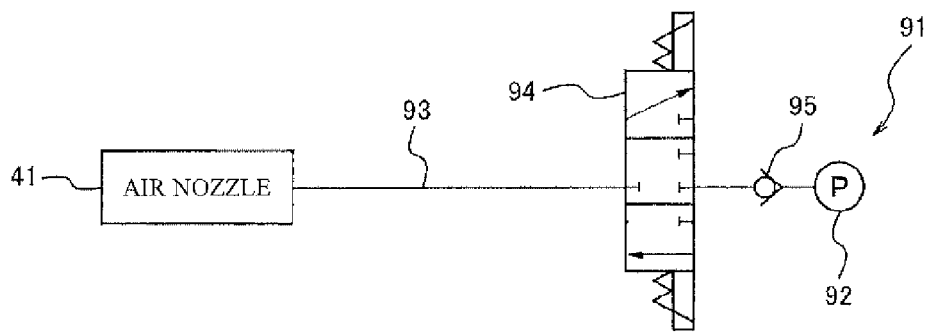
FIG. 6 is a schematic view illustrating an air supply and exhaust device of the water flow electricity generating device in FIG. 2.

FIG. 6 is a schematic view illustrating an air supply and exhaust device 91 of the water flow electricity generating device 1 in FIG. 2. As illustrated in FIGS. 2 and 6, the air is supplied to the air nozzle 41 through an air channel 93. The air channel 93 is constructed by the air pipes 19 and 66. The air supply and exhaust device 91 includes an air pump 92 that supplies the air to the air channel 93, an electromagnetic changeover valve 94 that switches the air channel 93 among a closed state, a supply state, and an exhaust state, and a check valve 95 that prevents the reverse flow of the air into the air pump 92. Further, the air pump 92, the electromagnetic changeover valve 94, and the check valve 95 are disposed in the control chamber 5. The relief valve for protecting the circuit is not illustrated in FIG. 6.

Figure 7:
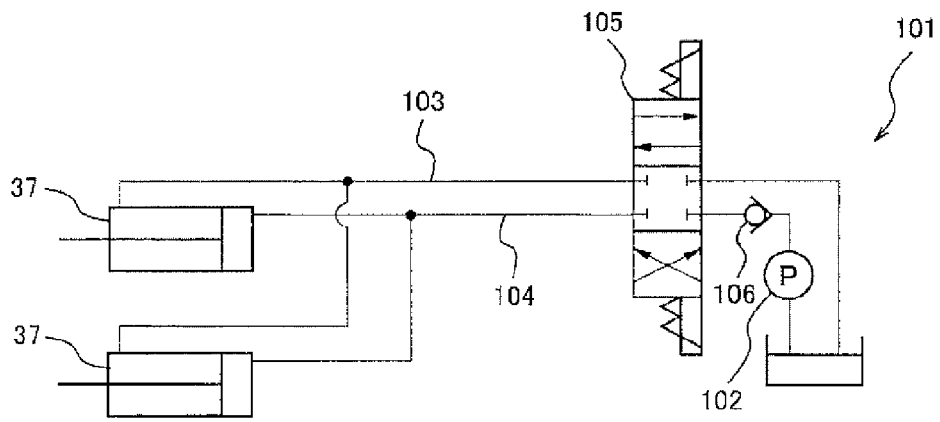
FIG. 7 is a schematic view illustrating a pitch-angle driving device of the water flow electricity generating device in FIG. 2.

FIG. 7 is a schematic view illustrating a pitch-angle driving device 101 of the water flow electricity generating device 1 in FIG. 2. As illustrated in FIGS. 2 and 7, the pitch-angle driving device 101 includes the hydraulic cylinders 37 that change the pitch angle of the rotating blade 8, hydraulic channels 103 and 104 that are constructed by the hydraulic pipes 15, 16, 62, and 63 to transmit the hydraulic pressure to the hydraulic cylinders 37, a hydraulic pump 102 that supplies the water to the hydraulic channel 103 or the hydraulic channel 104, an electromagnetic changeover valve 105 that switches the hydraulic channels 103 and 104 among a closed state, a rod-side hydraulic pressure supply state, and a cap-side hydraulic pressure supply state, and a check valve 106 that prevents the reverse flow of the water into the hydraulic pump 106 (the relief valve for protecting the circuit is not illustrated in FIG. 7). The hydraulic pump 102, the electromagnetic changeover valve 105, and the check valve 106 are disposed in the control chamber 5. The relief valve for protecting the circuit is not illustrated in FIG. 7.

Figure 8:
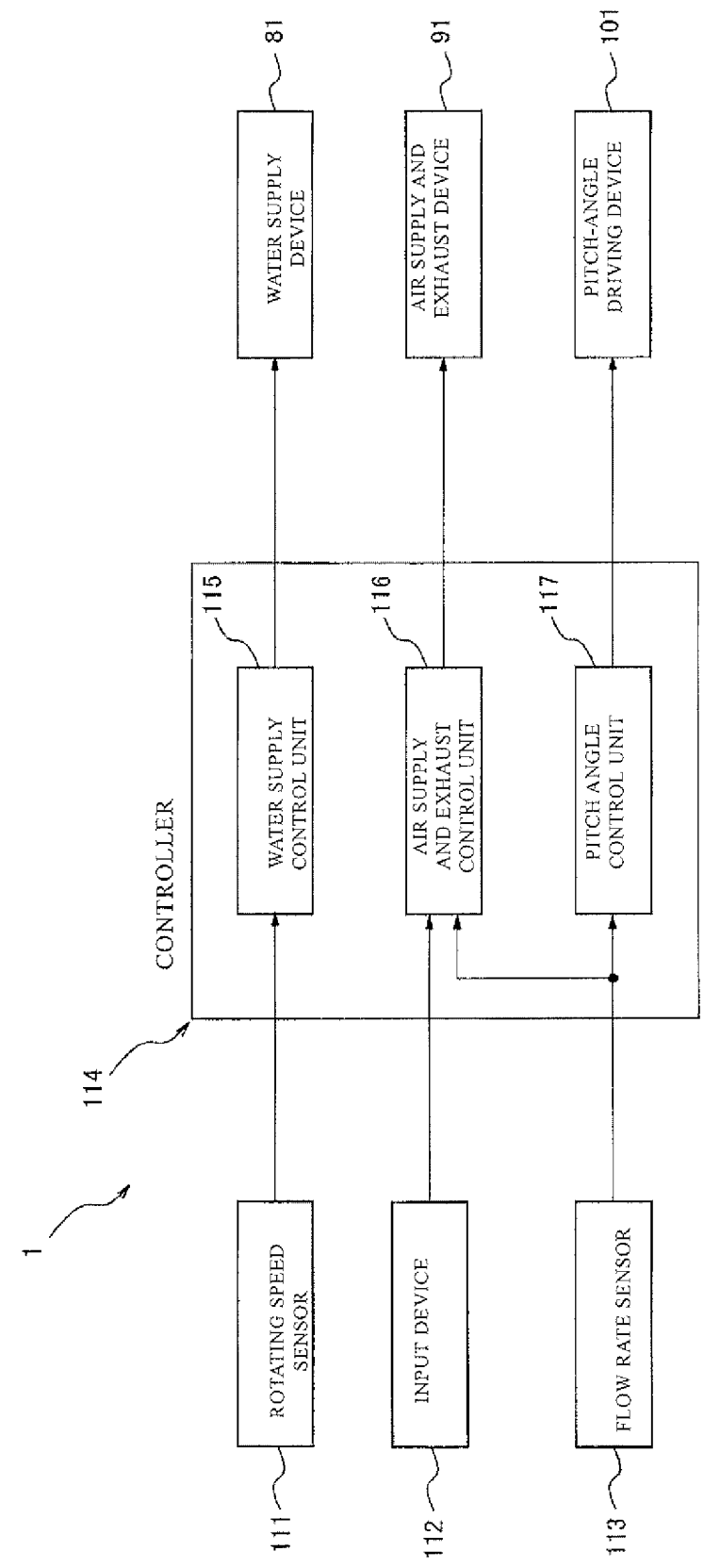
FIG. 8 is a block diagram illustrating a control system of the water flow electricity generating device in FIG. 2.

FIG. 8 is a block diagram illustrating a control system of the water flow electricity generating device 1 in FIG. 2. As illustrated in FIG. 8, the water flow electricity generating device 1 includes a controller 114 that is disposed in the control chamber 5 (see FIG. 1). A rotating speed sensor 111, an input device 112, and a flow rate sensor 113 are connected to the controller 114. The rotating speed sensor 111 detects a rotating speed of the rotor 7 (see FIG. 2). The input device 112 to which a user can input an instruction. Further, the flow rate sensor 113 can detect a flow rate of the water flow around the electricity generating unit 4 (see FIG. 2). The water supply device 81, the air supply and exhaust device 91, and the pitch-angle driving device 101 are connected to the controller 114. Specifically, the water pump 82, the electromagnetic on-off valves 85 and 86, the air pump 92, the electromagnetic changeover valve 94, the hydraulic pump 102, and the electromagnetic changeover valve 105 (see FIGS. 5 to 7) are connected to the controller 114. The controller 114 includes a water supply control unit 115, an air supply and exhaust control unit 116, and a pitch angle control unit 117. The air supply and exhaust device 91 and the air supply and exhaust control unit 116 constitute an air volume adjusting device.

As illustrated in FIGS. 3, 5, and 8, the water supply control unit 115 controls the water supply device 81 according to the rotating speed of the rotor 7, which is detected by the rotating speed sensor 111. Specifically, the water supply control unit 115 controls the water supply device 81 such that the water is discharged from the water discharge holes 39c and 40c in the radial surfaces 39a and 40a of the water-lubricated bearings 39 and 40 at the beginning of the rotation of the rotor 7 (a period until the rotor 7 in the substantial stop state reaches a predetermined rotating speed since the rotor 7 starts the rotation). Further, the water supply control unit 115 controls the water supply device 81 such that the water is discharged from the water discharge hole 39d in the thrust surface 39b of the water-lubricated bearing 39 in the whole rotation range except a stopping time of the rotor 7.

As illustrated in FIGS. 2, 6, and 8, the air supply and exhaust control unit 116 controls the air supply and exhaust device 91 according to the user's input from the input device 112 or the flow rate detected by the flow rate sensor 113. Specifically, when the user inputs an exhaust instruction to the input device 112 during the maintenance or the like, the air supply and exhaust control unit 116 switches the electromagnetic changeover valve 94 to the exhaust state to contract the float unit 43, and flows the water into the front-end dome unit 46. As described later, when the flow rate detected by the flow rate sensor 113 is larger than a cutout value to put the rotating blade 8 into a feathering state, the air supply and exhaust control unit 116 switches the electromagnetic changeover valve 94 to the exhaust state to contract the float unit 43, and flows the water into the front-end dome unit 46 to stably stop the rotor 7.

As illustrated in FIGS. 2, 7, and 8, the pitch angle control unit 117 controls the pitch-angle driving device 101 according to the flow rate detected by the flow rate sensor 113. Specifically, the pitch angle control unit 117 controls the pitch-angle driving device 101 so as to obtain the pitch angle at which the rotating blade 8 rotates easily in a low-speed range where the flow rate ranges from zero to a predetermined low-speed value. Further, the pitch angle control unit 117 controls the pitch-angle driving device 101 so as to obtain the pitch angle at which a torque generation efficiency (electricity generating efficiency) of the rotating blade 8 is maximized in a normal range, where the flow rate is larger than that of the low-speed range and is smaller than a rated value corresponding to a rated electricity generating capacity.

The pitch angle control unit 117 controls the pitch-angle driving device 101 such that the pitch angle of the rotating blade 8 is increased in order to prevent the electricity generation output from exceeding rating in a high-speed range where the flow rate is larger than the rated value and is smaller than the predetermined cutout value. Particularly, when the flow rate reaches the high-speed range, the pitch angle control unit 117 controls the pitch-angle driving device 101 such that the electricity generation output converges to the rating, and such that the pitch angle of the rotating blade 8 increases gradually with increasing flow rate.

When the flow rate is larger than the predetermined cutout value (the value that is larger than the rated value by a predetermined amount), the pitch angle control unit 117 controls the pitch-angle driving device 101 such that the pitch angle of the rotating blade 8 becomes substantially 90 degrees to put the rotating blade 8 into the feathering state. At the same time, when the flow rate is larger than the cutout value, the air supply and exhaust control unit 116 controls the air supply and exhaust device 91 such that the float unit 43 is contracted, and such that the water is caused to invade into the front-end dome unit 46 to stably stop the rotor 7.

(Effect of Water Flow Electricity Generating Device 1)

According to the above configuration, because the rotor 7 includes the float unit 43 that is disposed on the front side in the direction of the rotating axis line L2 of the rotor main body 32, the buoyant force acts on the portion on the front side in the direction of the rotating axis line L2 of the rotor main body 32 in the rotor 7. As a result, even in the configuration, such as the cantilever, in which the blade support unit 33 is disposed on the front side in the direction of the rotating axis line L2 of the rotor main body 32, the action of gravity such that the free end side of the cantilever hangs down is relaxed. Accordingly, the durability degradation due to the action of the biased load on the bearings 39 and 40 supporting the rotor 7 can be suppressed. The water-lubricated bearings 39 and 40 in which not the oil but the water is used as the lubrication medium can easily be used by suppressing the action of the biased load on the bearings 39 and 40. Therefore, the oil-lubrication device requiring the complicated seal structure is eliminated, the device cost can be reduced, and the maintenance can be improved with no risk of oceanic pollution.

The area of the radial surface 40*a* of the second water-lubricated bearing 40 is larger than the area of the radial surface 39*a* of the first water-lubricated bearing 39, so that the load on the blade support unit 33 in which the rotating blade 8 is provided can sufficiently be supported. The water supply control unit 115 controls the water supply device 81 at the beginning of the rotation of the rotor 7 such that the water is discharged radially upward from the water discharge holes 39*c* and 40*c*, so that the rotor 7 can smoothly be started. Further, the water supply control unit 115 controls the water supply device 81 during the rotation of the rotor 7 such that the water is discharged in the opposite direction to the water flow from the water discharge hole 39*d*. Therefore, the load in the thrust direction, which is generated in the rotor 7 such that the water flow impinges on the rotating blade 8, is sufficiently supported to be able to continue the smooth rotation of the rotor.

The pitch angle control unit 117 controls the pitch-angle driving device 101 according to the flow rate detected by the flow rate sensor 113. Therefore, the rotating speed of the rotor 7 can properly be controlled according to the flow rate, the electricity can efficiently be generated to the high flow rate even in the electricity generator having the low rated capacity. Furthermore, because the hydraulic cylinder 37 is used as the pitch-angle driving device 101, the risk of the oceanic pollution is eliminated compared with the use of the oil-pressure cylinder, and the water medium can be shared by the hydraulic cylinder 37 and the water-lubricated bearings 39 and 40.

The air volume in the float unit 43 is adjustable, so that the buoyant force generated in the front portion of the rotor 7 can be adjusted according to a running status. When the flow rate detected by the flow rate sensor 113 is larger than the cutout flow rate (the maximum flow rate), the air supply and exhaust control unit 116 contracts the float unit 43 to cause the water to invade into the front-end dome unit 46 of the rotor 7, so that the stop of the rotation of the rotor 7 can stably be promoted. In addition, because the float unit 43 can also be contracted by the input device 112, the rotor 7 can stably be stopped when a worker performs the maintenance.

EXAMPLE

Figure 9:
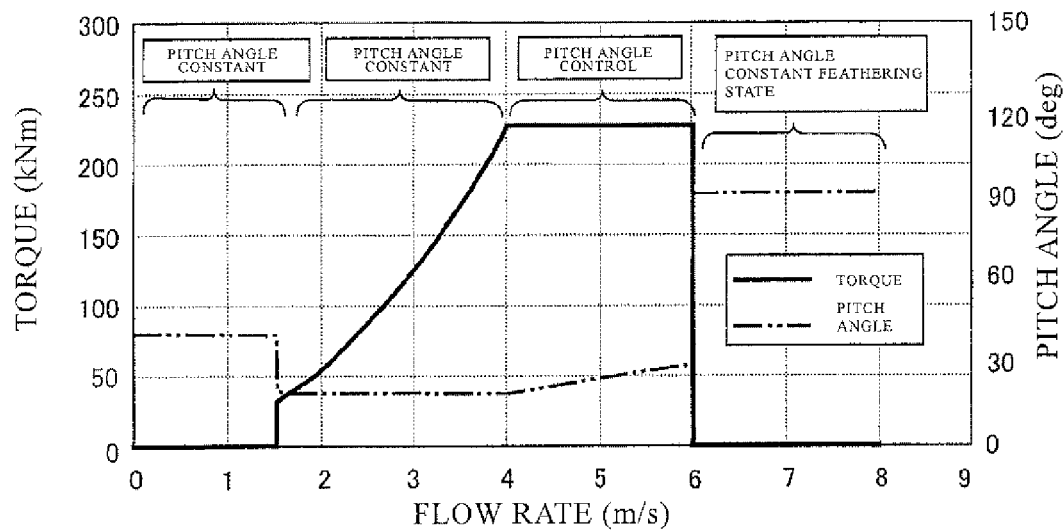
FIG. 9($a$) is a graph illustrating a relationship between a flow rate and a torque and a relationship between the flow rate and a pitch angle in an example, and FIG. 9($b$) is a graph illustrating a relationship between the flow rate and an output and a relationship between the flow rate and a rotating speed in that case.
Figure 9:
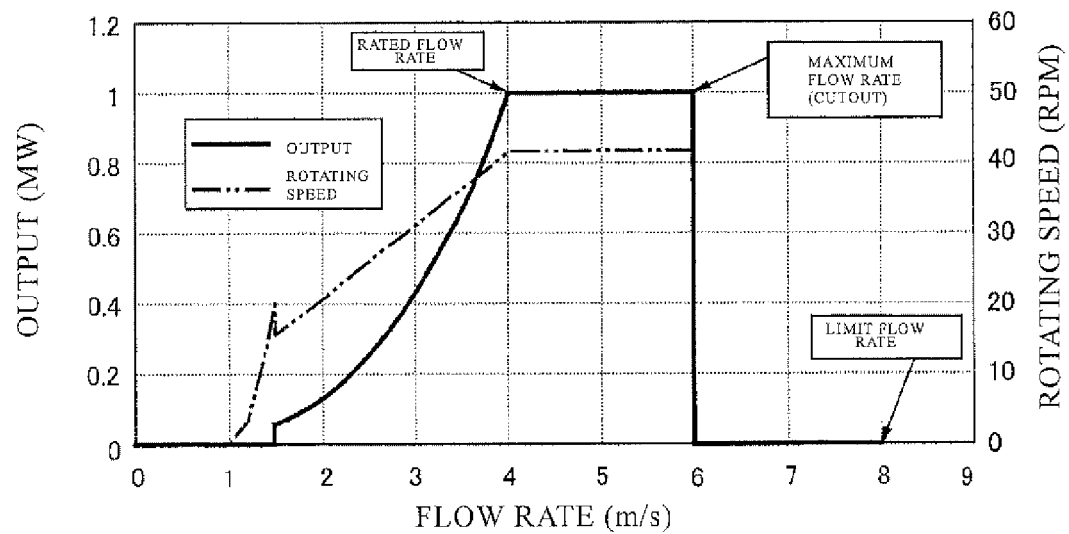

FIG. 9(*a*) is a graph illustrating a relationship between a flow rate and a torque and a relationship between the flow rate and a pitch angle in an example, and FIG. 9(*b*) is a graph illustrating a relationship between the flow rate and an output and a relationship between the flow rate and a rotating speed in that case. As illustrated in FIGS. 9(*a*) and 9(*b*), in the example, the pitch angle is controlled at a constant value of about 80 degrees such that the rotating blade 8 rotates easily in the low-speed range where the flow rate ranges from 0 to 1.5 m/s. Also, the pitch angle is controlled at a constant value of about 40 degrees (the rated flow rate of 4 m/s) such that torque generation efficiency (electricity generation efficiency) is improved in the normal range where the flow rate ranges from 1.5 to 4 m/s. Further, in the high-speed range where the flow rate ranges from 4 to 6 m/s, the variable control of the pitch angle is performed from about 40 to about 60 degrees such that the electricity generation output converges to the rating, and such that the pitch angle increases gradually with increasing flow rate (the cutout flow rate of 6 m/s). When the flow rate exceeds 6 m/s, the pitch angle is controlled at a constant value of about 90 degrees.

Comparative Example

Figure 10:
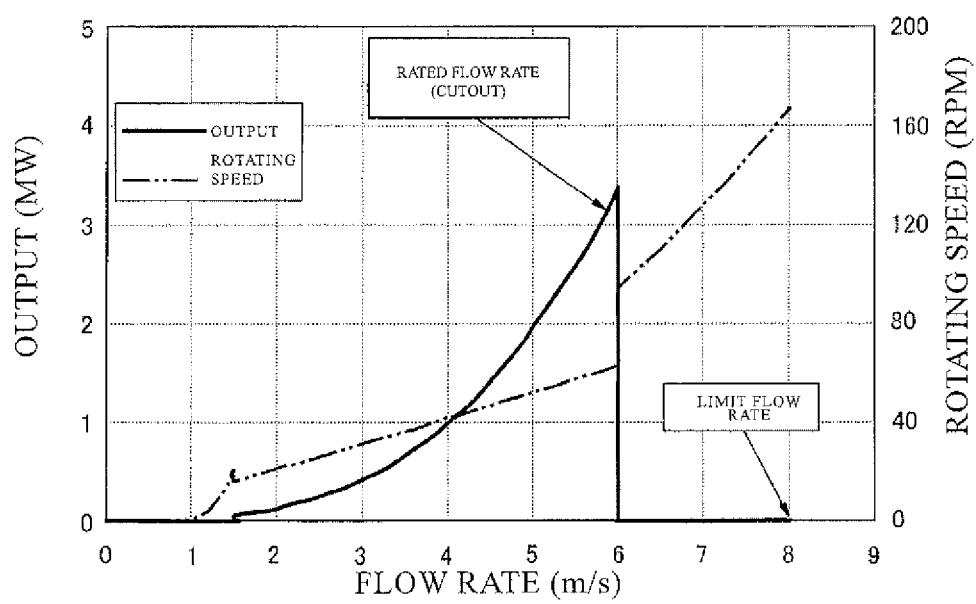
FIG. 10 is a graph illustrating the relationship between the flow rate and the output and the relationship between the flow rate and the rotating speed in a comparative example.

FIG. 10 is a graph illustrating the relationship between the flow rate and the output and the relationship between the flow rate and the rotating speed in a comparative example. As illustrated in FIG. 10, in the comparative example, because the pitch angle is fixed (for example, 40 degrees), the rated flow rate is matched with the cutout flow rate (the maximum flow rate at which the electricity can be generated). In order to compare the example to the comparative example in the same electricity generation range, then, the rated flow rate of the comparative example is matched with the maximum flow rate (cutout flow rate) of the example. Therefore, in the comparative example, it is necessary to prepare the electricity generator having the rated electricity generating capacity that is at least triple the example. In the comparative example, the electricity generation output increases gradually with increasing flow rate in the electricity generation range where the flow rate ranges from 0 to 6 m/s (the rated flow rate of 6 m/s). When the flow rate exceeds 6 m/s, an electric load is separated from the electricity generator such that a current is not passed through the electric load, and the rotating blade rotates freely.

Comparison of Example and Comparative Example

In the comparative example, because the pitch angle is fixed, it is necessary to prepare the electricity generator having the rated electricity generating capacity that is at least triple the example in order to equalize the rated flow rate to the cutout flow rate (the maximum flow rate), thereby leading to the high cost. On the other hand, in the example, because the maximum flow rate of the rated flow rate is set to the smaller value, the electricity can efficiently be generated to the high flow rate even in the electricity generator having the small rated electricity generating capacity. In the comparative example, in a non-load running state exceeding 6 m/s, an induced voltage is generated in the coil according to the rotating speed even if the current is not passed. Therefore, it is necessary to increase withstand voltages of electric components such as a cable and a breaker so as not to generate breakdown, thereby leading to the high cost. On the other hand, in the example, when the flow rate exceeds 6 m/s, the electricity generator is put into the feathering state in which the pitch angle is set to about 90 degrees, the rotating speed does not increase, but the generation of the induced voltage is prevented. Therefore, it is not necessary to increase the withstand voltage of each electric component.

In the above embodiment, the movable partition member that partitions the water W and the air chamber 45 of the float unit 43 is constructed by the bag unit 44 that is the air bag. Alternatively, a piston that partitions the air chamber and a water chamber may be used as the movable partition member. In the above embodiment, the flow rate sensor 113 is used as the sensor, which detects the parameter that increases or decreases with increasing or decreasing flow rate of the water flow when the pitch angle of the rotating blade 8 is kept constant. Alternatively, the pitch angle may be controlled using the rotating speed sensor 111 instead of the flow rate sensor 113. In this case, when the detected rotor rotating speed exceeds the rated rotating speed corresponding to the rated electricity generating capacity, feedback control of the pitch angle is performed such that the detected rotor rotating speed converges to the rated rotating speed, and the pitch angle may be set to about 90 degrees when the detected rotor rotating speed exceeds the rated rotating speed even in the feedback control. The present invention is not limited to the above embodiment, but the configuration can be changed, added, and deleted without departing from the scope of the present invention. The embodiments may arbitrarily be combined. For example, part of the configuration or method of one embodiment may be applied to another embodiment.

The water flow electricity generating device according to the embodiment has the configuration in which the floating body 2 hangs down. The water flow electricity generating device is, however, not limited to the embodiment, but the water flow electricity generating device may be installed on a base fixed to a bottom of water or a support post.

The invention claimed is:

1. A water flow electricity generating device comprising:
a stator that supports an annular stator core in which a coil is provided;
a rotor that includes a magnet, a rotor main body, a blade support unit, and a rotating blade, the magnet causing a magnetic force to act on the coil, the rotor main body being disposed on an inner circumferential side of the stator core to support the magnet, the blade support unit being provided on one side in a rotating axis line direction of the rotor main body, the rotating blade projecting radially outward from the blade support unit;
a water-lubricated bearing that is disposed while being opposed to the rotor main body, the water-lubricated bearing supporting loads in a thrust direction and a radial direction; and
an air volume adjusting device,
wherein the blade support unit is disposed on one side in the rotating axis line direction of the rotor main body,
the rotor includes a float unit that is disposed on one side in the rotating axis line direction of the rotor main body, and
the air volume adjusting device adjusts an air volume in the float unit.

2. The water flow electricity generating device according to claim 1, wherein the float unit is provided on one side in the rotating axis line direction of the blade support unit.

3. The water flow electricity generating device according to claim 1, wherein
the water-lubricated bearing includes: a first water-lubricated bearing; and a second water-lubricated bearing that is disposed between the first water-lubricated bearing and the blade support unit, and
an area of a radial surface that supports the load in the radial direction in the second water-lubricated bearing is larger than an area of a radial surface that supports the load in the radial direction in the first water-lubricated bearing.

4. The water flow electricity generating device according to claim 1, comprising:
a headrace that conducts water to a surface of the water-lubricated bearing, the surface being opposed to the rotor main body;
a water supply device that supplies the water to the headrace; and
a water supply control device that controls an operation of the water supply device.

5. The water flow electricity generating device according to claim 4, wherein
the water-lubricated bearing includes: the radial surface that supports the load in the radial direction; and a water discharge hole that is opened radially inward in the radial surface so as to be opposed to the rotor main body,
wherein the headrace is communicated with the water discharge hole, and
the water supply control device controls the water supply device such that the water is discharged from the water discharge hole at beginning of rotation of the rotor.

6. The water flow electricity generating device according to claim 4, wherein
the water-lubricated bearing includes: a thrust surface that supports the load, which is generated in the rotor such that the water flow impinges on the rotating blade, in the thrust direction; and a water discharge hole that is opened in the thrust surface toward an opposite direction to a water flow direction so as to be opposed to the rotor main body,
wherein the headrace is communicated with the water discharge hole, and
the water supply control device discharges the water from the water discharge hole in rotating the rotor.

7. The water flow electricity generating device according to comprising:
   a sensor that can detect a flow rate of the water flow or a parameter, the parameter increasing or decreasing with increasing or decreasing flow rate of the water flow when a pitch angle of the rotating blade is kept constant;
   a pitch-angle driving device that changes the pitch angle of the rotating blade; and
   a pitch-angle control device that controls the pitch-angle driving device according to a value detected by the sensor.

8. The water flow electricity generating device according to claim 7, wherein a hydraulic cylinder is used as the pitch-angle driving device.

9. The water flow electricity generating device according to claim 7, wherein the pitch-angle control device performs the pitch-angle driving control to set an electricity generating capacity to a rated electricity generating capacity when the value detected by the sensor is larger than the rated value and is smaller than a predetermined cutout value, and the pitch-angle control device performs the pitch-angle driving control to set the pitch angle of the rotating blade to substantially 90 degrees when the value detected by the sensor is larger than the cutout value.

10. The water flow electricity generating device according to claim 1, further comprising a sensor that can detect a flow rate of the water flow or a parameter, the parameter increasing or decreasing with increasing or decreasing flow rate of the water flow when a pitch angle of the rotating blade is kept constant,
   wherein the air volume adjusting device decreases the air volume when the value detected by the sensor is larger than a predetermined cutout value larger than a rated value corresponding to the rated electricity generating capacity.

11. The water flow electricity generating device according claim 1, wherein the float unit includes: an air chamber; and a movable partition member that defines the air chamber, an outer surface of the movable partition member being in contact with the water,
   wherein the air volume adjusting device moves the movable partition member to change a volume of the air chamber.

* * * * *